(12) United States Patent
Yoda

(10) Patent No.: US 9,738,021 B2
(45) Date of Patent: Aug. 22, 2017

(54) HORIZONTAL MOLD CLAMPING MECHANISM

(71) Applicant: NISSEI PLASTIC INDUSTRIAL CO., LTD., Hanishina-gun, Nagano (JP)

(72) Inventor: Hozumi Yoda, Nagano (JP)

(73) Assignee: NISSEI PLASTIC INDUSTRIAL CO. LTD. (JP)

( * ) Notice: Subject to any disclaimer, the term of this patent is extended or adjusted under 35 U.S.C. 154(b) by 0 days.

(21) Appl. No.: 14/933,072

(22) Filed: Nov. 5, 2015

(65) Prior Publication Data
US 2016/0121530 A1    May 5, 2016

(30) Foreign Application Priority Data
Nov. 5, 2014 (JP) .................................. 2014-224952

(51) Int. Cl.
*B29C 45/17* (2006.01)
*B29C 45/67* (2006.01)

(52) U.S. Cl.
CPC ...... *B29C 45/6728* (2013.01); *B29C 45/1761* (2013.01); *B29C 45/1744* (2013.01); *B29C 45/1747* (2013.01)

(58) Field of Classification Search
CPC ............ B29C 45/1744; B29C 45/1747; B29C 45/1761; B29C 45/6728
See application file for complete search history.

(56) References Cited

U.S. PATENT DOCUMENTS

| 5,744,177 A * | 4/1998 | Lin ......................... B29C 45/66 |
|---|---|---|
| | | 425/589 |
| 5,863,474 A * | 1/1999 | Ito ........................ B29C 45/6707 |
| | | 264/328.1 |

(Continued)

FOREIGN PATENT DOCUMENTS

| JP | 2036410 | 3/1990 |
|---|---|---|
| JP | 11235741 | 8/1999 |

(Continued)

OTHER PUBLICATIONS

Abstract, Publication No. 11-235741, Publication Date Aug. 31, 1999.

(Continued)

*Primary Examiner* — James Mackey
(74) *Attorney, Agent, or Firm* — Adams & Wilks

(57) ABSTRACT

A horizontal mold clamping mechanism includes a rail disposed on a base, a slider fitted with the rail, and a pedestal placed on the slider and provided with a sub-slider guided by a sub-rail. A fixed platen secured to the base supports a fixed mold. A mold clamping cylinder is secured to the pedestal and laid parallel to the fixed platen. A mold opening/closing actuator connects to the pedestal for moving the mold clamping cylinder. A movable platen is secured to the sub-slider and disposed between the fixed platen and the clamping cylinder. A tie-bar passes through the movable platen and the clamping cylinder, and a first linking mechanism selectively links the clamping cylinder to the tie-bar. The movable platen has a through-hole with a diameter greater than an outer diameter of the tie-bar to provide a clearance preventing slide-contact between the tie-bar and an inner surface of the through-hole.

12 Claims, 7 Drawing Sheets

(56) References Cited

U.S. PATENT DOCUMENTS

| | | | |
|---|---|---|---|
| 6,655,949 B2* | 12/2003 | Chikazawa | B29C 45/6707 425/190 |
| 2004/0208952 A1* | 10/2004 | Nishimura | B29C 45/1761 425/595 |
| 2005/0170037 A1* | 8/2005 | Koike | B29C 45/7653 425/595 |

FOREIGN PATENT DOCUMENTS

| | | | |
|---|---|---|---|
| JP | 2000246774 | | 9/2000 |
| JP | 3881764 | | 11/2006 |
| JP | 2011-37187 | * | 2/2011 |
| JP | 2013114551 | | 8/2013 |
| WO | 2009051095 | | 4/2009 |

OTHER PUBLICATIONS

Notification of Reasons for Refusal mailed Jan. 31, 2017 issued in Japanese Patent Application No. 2014-224952 together with English translation thereof.

* cited by examiner

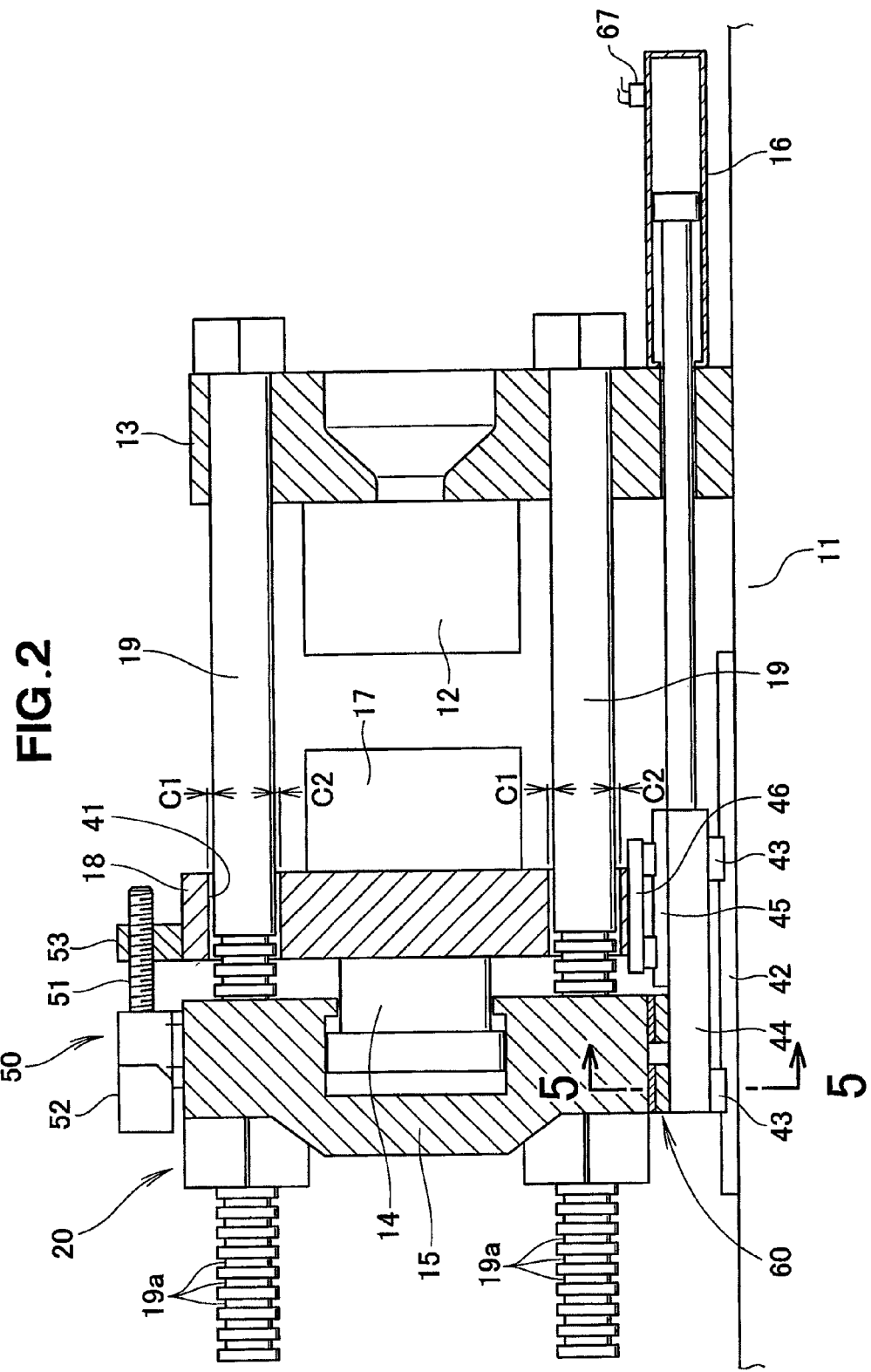

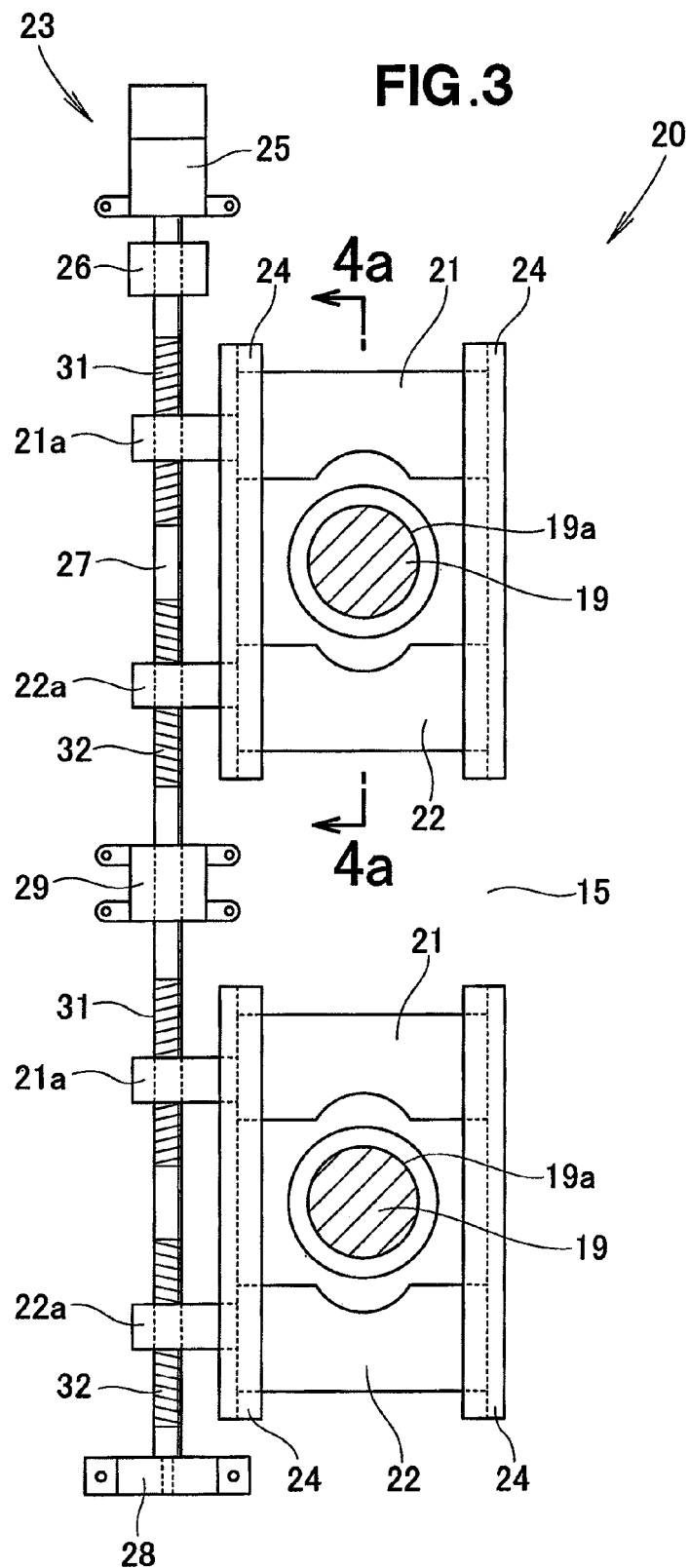

HORIZONTAL MOLD CLAMPING MECHANISM

FIELD OF THE INVENTION

The present invention relates to an improvement in a horizontal mold clamping mechanism suitable for use with a horizontally-laid injection molding system.

BACKGROUND OF THE INVENTION

A horizontal injection molding system includes, as major elements, a mold clamping mechanism for clamping a mold and an injecting machine for injecting a resin material into the clamped mold.

Generally, a mold clamping mechanism is comprised of a stationary platen for supporting a stationary mold member of the mold, a pressure receiving platen disposed parallel to the stationary platen for supporting a mold clamping cylinder, a tie-bar extending between the pressure receiving platen and the stationary platen, and a movable platen capable of guided movement by the tie-bar and moved by the mold clamping cylinder for supporting a movable mold member of the mold.

Movement and mold clamping are performed continuously with respect to the movable platen by the mold clamping cylinder. In recent years, however, proposals have been made such that the movement is effected by a separate mold opening/closing actuator while the mold clamping is effected by the mold clamping cylinder, so as to shorten the required process or engineering time and to increase the productivity (see, e.g., JP 3881764 B—hereinafter referred to as "Patent Literature 1).

In the apparatus of Patent Literature 1, a pedestal is placed on a frame via a sliding plate. A mold clamping cylinder is fixed to the pedestal. The pedestal is moved horizontally by a mold opening/closing actuator. A movable platen is placed on the pedestal through the sliding plate. Top end of an operating rod extending from the mold clamping cylinder is connected to the movable platen.

In a mold-open state, the movable mold stays away from the fixed mold. For mold clamping, firstly, the mold opening/closing actuator is caused to retreat. This causes the pedestal to slide on the sliding plate toward a fixed platen. The mold clamping cylinder moves together with the pedestal whereby the movable platen moves together with the mold clamping cylinder. As a result, the movable mold comes into contact with the fixed mold.

In the meantime, the movable platen is guided by the tie-bar. Top ends of the tie-bar pass through the mold clamping cylinder to project therefrom and pass between half nuts.

Upon contact of the movable mold with the fixed mold, half nuts are brought to come close to each other so as to pinch the top ends of the tie-bar. This brings the tie-bar and the mold clamping cylinder into a unitary whole. Next, the mold clamping cylinder is advanced to cause the operational rod to move forward. This causes the movable mold to be pressed against the fixed mold through the movable platen to thereby complete the mold clamping.

By making the moving velocity of the mold opening/closing actuator higher than that of the mold clamping cylinder, it becomes possible to shorten the moving velocity of the movable mold. To achieve precise guiding of the movable platen by the tie-bar, an outer peripheral surface of the tie-bar is brought into sliding contact with an inner peripheral surface of a through-hole.

Since the movable platen moves to the stationary tie-bar highly frequently, one or both of the inner peripheral surface of the through-hole and the outer peripheral surface of the tie-bar becomes inevitably roughened. Such roughening will not occur uniformly but unevenly. Such uneven roughening will render the associated slide resistance unstable. Such unstable slide resistance presents a bar in a conventional injection molding process, as explained next. As shown in FIG. 8A, a movable mold 102 is clamped with a fixed mold 10 with a mold clamping force P1. In FIG. 8B, a molten resin material 103 is injected into a cavity. An injecting force P2 at this time is larger than the mold clamping force P1. As a result, up until both forces are balanced, the movable mold 102 opens a distance or gap, L1 relative to the fixed mold 101. Gas contained in the resin material 103 is discharged through the gap L1.

As the resin material 103 solidified and shrunk, the distance becomes L2 which is smaller than L1. The movable mold 102 advances a distance corresponding to (L1-L2). This provides a good-quality molded article free of nests and sink marks.

If the movement of the movable mold 102 becomes unstable at this time, the gap L1 becomes excessively small or excessively large. If the gap L1 becomes excessively small, degassing becomes insufficient. If the gap L1 becomes excessively large, the resin material 103 leaks together with the gas. Thus, the particular injection molding process shown in FIGS. 8A-8C is unsuited to the mold clamping mechanism of Patent Literature 1. Therefore, there is a demand for an arrangement that can move the movable mold 102 smoothly with a relatively small force (mold clamping force P1).

Consequently, so as to satisfy the recent demand for productivity increase, needed is such an arrangement in a mold clamping mechanism having a mold opening/closing actuator and a mold clamping cylinder which can move a movable mold smoothly after operation for a long period of time.

SUMMARY OF THE INVENTION

It is therefore an object of the present invention to provide a mold clamping mechanism including a mold opening/closing actuator and a mold clamping cylinder, which mechanism is configured to enable smooth movement of a movable mold after an operation for an extended period of time.

According to the present invention, there is provided a horizontal mold clamping mechanism, which comprises: a base; a fixed platen secured to the base for supporting a fixed mold; a mold clamping cylinder laid parallel to the fixed platen, having a piston rod extending toward the fixed mold and horizontally movably supported on the base; a mold opening/closing actuator for moving the mold clamping cylinder; a movable platen disposed between the fixed platen and the mold clamping cylinder, the movable platen being connected to the piston rod and horizontally movably supported on the base for supporting the movable mold; a tie-bar extending horizontally from the fixed platen and passing through the movable platen and the mold clamping cylinder; and a first linking mechanism for optionally linking the mold clamping cylinder to the tie-bars, wherein the movable platen is provided with a through-hole having a hole diameter corresponding to an outer diameter of the tie-bar, added with a clearance for the tie-bar not to slide-contact with an inner peripheral surface of the through-hole.

As explained above, the through-hole formed in the movable platen is added with the clearance for the tie-bar not to contact the through-hole of the tie-bar. As a result, movement of the movable platen interfered by the tie-bar, whereby the arrangement which enables smooth movement of the movable platen is provided.

Preferably, the horizontal mold clamping mechanism further comprises a rail disposed on the base, a slider fitted with the rail, and a pedestal placed on the slider. The mold opening/closing actuator is connected to the pedestal. The mold clamping cylinder may be secured to the pedestal. The pedestal may be provided with a sub-rail and a sub-slider fitted with the sub-rail, and the movable platen is secured to the sub-slider. In this arrangement, with the movable platen fixed to the sub-slider, the movable platen moves smoothly without being laterally swung.

It is desirable that the sub-slider comprise the linear guide placed in sliding contact with the sub-rail via rolling elements. It is generally known that rolling resistance is as small as about 1/10 of skid resistance. Thus, use of the rolling elements enables significant reduction resistance associated with the movement of the movable platen.

The mold clamping cylinder is desirably secured to the pedestal via the height adjusting mechanism. There is a fear that by accumulation of machining errors, the center of the tie-bar will be offset in a height direction from the center of the through-hole of the movable platen. In this instance, the center of the tie-bar can be adjusted by the height adjusting mechanism so as to coincide with the center of the through-hole of the movable platen.

It is preferable that the horizontal mold clamping mechanism further comprise a rail disposed on the base and first and second sliders fitted with the rail, the mold clamping cylinder be secured to the first slider, the first slider be secured to the mold opening/closing actuator, and the movable platen be secured to the second slider. Compared to the aforementioned arrangement, it is possible to omit the pedestal and hence to render the construction compact.

Desirably, each of the first and second sliders comprises a linear guide held in sliding contact with the rail through rolling elements. Use of the rolling elements significantly reduces the resistance associated with the movement of the movable platen and the mold clamping cylinder.

In a preferred form, the first linking mechanism comprises a plurality of circumferential grooves formed in the tie-bar, lock-plates engaged in the circumferential grooves, a lock-plate moving actuator for moving the lock-plates in a direction orthogonal to an axis of the tie-bar, and a guide disposed on the mold clamping cylinder for suppressing movement of the lock-plates in an axial direction of the tie-bar. As the lock-plates are engaged in the circumferential groves, the tie-bars and the mold clamping cylinder come into a unitary whole. As the lock pates are disengaged from the circumferential grooves, the mold clamping cylinder is capable of moving relative to the tie-bars in an axial direction of the latter. A so-called lock/unlock mechanism is formed merely of the lock-plates and the lock-plate moving actuator. Owing to these simple constituents, the first linking mechanism becomes inexpensive to manufacture.

It is desirable that the mold clamping cylinder and the movable platen are provided, apart from the piston rod, with a second linking mechanism that mechanically connects the mold clamping cylinder and the movable platen together. It is likely that the piston rod will move within the mold clamping cylinder as the movable mold is caused to approach the fixed mold by the mold opening/closing actuator. As such a movement occurs, the relative positions of the mold clamping cylinder and the movable platen will change to thereby leave a fear that the lock-plates may not get engaged in the circumferential grooves. As a countermeasure, the second linking mechanism is provided so as to maintain the relative positions of the mold clamping cylinder and the movable platen constant.

Preferably, the second linking mechanism comprises a ball screw laid parallel to the tie-bar, a rotary actuator for rotating the ball screw, and a ball nut engaged in the ball screw. Since the ball screw is a precision mechanism, it becomes possible to precisely determine the relative positions of the mold clamping cylinder and the movable platen. In addition, as a result of the rotary actuator being freed, the ball screw is rendered capable of free rotation whereby the movable platen can be freed from the mold clamping cylinder, as necessary.

It is desirable that the second linking mechanism comprise an arm extending from the mold clamping cylinder to the movable platen or from the movable platen to the mold clamping cylinder, a linear actuator mounted to the arm and having a rod extending orthogonal to the tie-bar, and a recessed part provided to the movable platen for allowing fitted engagement of the rod therein. As the linear actuator, an inexpensive pneumatic cylinder may be adopted, whereby the second linking mechanism can be manufactured inexpensively.

BRIEF DESCRIPTION OF THE ACCOMPANYING DRAWINGS

A preferred embodiment of the present invention will be described in detail below, with reference to the accompanying drawings, in which:

FIG. 2 is a cross-sectional view of the mold clamping mechanism of FIG. 1;

FIG. 3 is a view taken in the direction of arrows 3-3 of FIG. 1;

FIG. 4A is a cross-sectional view taken along line 4a-4a of FIG. 3 while

DETAILED DESCRIPTION OF THE PREFERRED EMBODIMENTS

Figure 1:
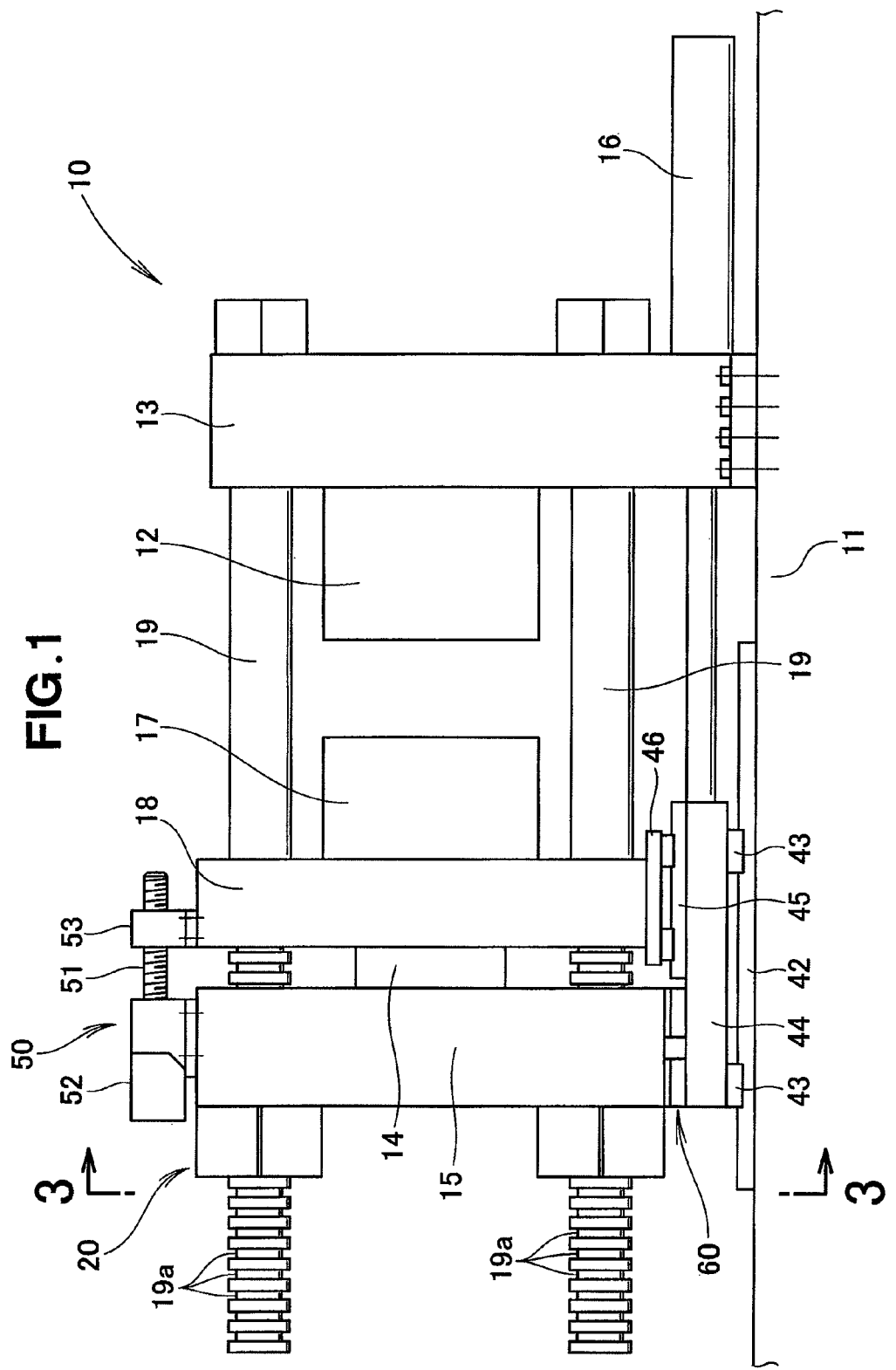
FIG. 1 is a side elevational view illustrating a mold clamping mechanism according to the present invention.

As shown in FIG. 1, a mold clamping mechanism 10 is a horizontal-type mold clamping mechanism which is comprised of: a base 11; a fixed or stationary platen 13 fixed to the base 11 for supporting a fixed or stationary mold 12; a mold clamping cylinder 15 laid parallel to the fixed platen 13, having a piston rod 14 extending toward the fixed mold 12 and horizontally movably supported on the base 11; a mold opening/closing actuator 16 for moving the mold clamping cylinder 15; a movable platen 18, which is disposed between the fixed platen 13 and the mold clamping cylinder 15, operatively connected to the piston rod 14, horizontally movably supported on the base 11, for supporting a movable mold 17; tie-bars 19, 19 extending horizontally from the fixed platen 13 and passing through the movable platen 18 and the mold clamping cylinder 15; and a first linking mechanism 20 for selectively linking the mold clamping cylinder 15 to the tie-bars 19, 19.

As shown in FIG. 2, the movable platen 18 is provided with a through-hole 41 of a hole diameter corresponding to a tie-bar outer diameter added with clearances C1, C2 for the tie-bars 19 not to slide-contact with an inner peripheral surface of the through-hole 41.

A rail 42 is prodded on the base 11. Sliders 43, 43 are placed in fitted engagement with the rail 42. A pedestal 44 is disposed on the sliders 43, 43. The mold clamping cylinder 15 is secured to the pedestal 44. Further, a sub-rail 45 is disposed on the pedestal 44. A sub-slider 46 is placed in fitted engagement with the sub-rail 45. The movable platen 18 is secured to the sub-slider 46.

The mold opening/closing actuator 16 is mounted to the fixed platen 13 with a piston rod connected to the pedestal 44 so as to extend parallel to the tie-bars 19.

Desirably, the sub-slider 46 is a linear guide that is held so as not to slide-contact with the sub-rail 45 through rolling elements formed of steel balls or steel rollers. The sub-slider 46 may be arranged to slide directly on the sub-rail 45. However, use of the rolling elements reduces a transfer resistance to $1/10$ and hence is desirable.

A second linking mechanism 50 is provided to the mold clamping cylinder 18 and the movable platen 18 so as to mechanically link the same separately from the piston rod 14. The second linking mechanism 50 is not a must but recommended to be provided.

In the embodiment being described, the second linking mechanism 50 is comprised of a ball screw 51 laid parallel to the tie-bars 19, a rotary actuator 52 for rotating the ball screw 51 and a ball nut 53 engaged with the ball screw 51. In the embodiment being described, the rotary actuator 52 is attached to the mold clamping cylinder 15 while the ball nut 53 is secured to the movable platen 18. Alternatively, the ball nut 53 may be attached to the mold clamping cylinder 15 while the rotary actuator 52 may be attached to the movable platen 18. Owing to the rolling elements disposed between the ball screw 51 and the ball nut 53, the resistance is significantly reduced and an internal gap is kept to a minimum.

As shown in FIG. 3, the first linking mechanism 20 is comprised of circumferential grooves 19a provided to the tie-bars 19, lock-plates 21, 22 engaged in the circumferential grooves 19a, and a lock-plate moving actuator 23 for moving the lock-plates 21, 22 perpendicularly to the axial directions of the tie-bars 19. The lock-plates 21, 22 are guided by guides 24, 24 of L-shaped cross-section so as not to move in the front-back direction of the drawing sheet (axial directions of the tie-bars).

The lock-plate moving actuator 23 is comprised of a servo motor 25 and a screw shaft 27 driven by means of a coupling 26. Top end part and intermediate part of the screw shaft 27 are supported by shaft supports 28, 29. The screw shaft 27 is provided with a right-hand thread 31 and a left-hand thread 32. A nut 21a extending from the upper lock-plate 21 is engaged with the right-hand thread 31 while a nut 22a extending from the lower lock-plate 22 is engaged with the left-hand thread 32. With this arrangement, as the screw shaft 27 is rotated in a normal direction, the upper and lower lock-plates 21, 22 synchronously move close to the circumferential grooves 19a. As the screw shaft 27 is rotated in a reverse direction, the upper and lower lock-plates 21, 22 synchronously move away from the circumferential grooves 19a.

Figure 4A:
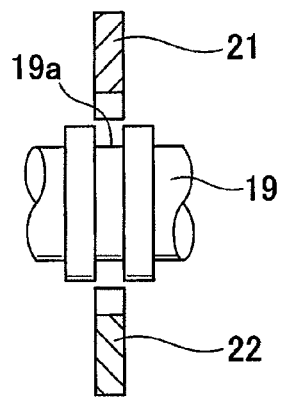
Figure 4B:
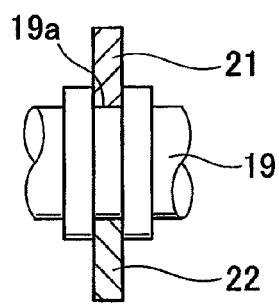
FIG. 4B illustrates an operation of the sectioned part illustrated therein.

In other words, the lock-plates 21, 22 shown in FIG. 4A, after they move close to the circumferential grooves 19a, come into fitted engagement with the grooves 19a as shown in FIG. 4B. In this state, the mold clamping cylinder 15 and the tie-bars 19 are mated unitarily. Conversely, in the state of FIG. 4A, the mold clamping cylinder 15 is movable relative to the tie-bars 19.

Turning back to FIG. 2, it is required that a clearance C1 and a clearance C2 be equal or substantially equal to each other. Otherwise, the movable platen 18 becomes liable to contact the tie-bars 19. Note also that machining errors inevitably occur in the pedestal 44, sub-rail 45, sub-slider 46, movable platen 18 and so forth. Consequently, it is likely that there will be a discrepancy between the clearance C1 and the clearance C2. To address this problem, provision is highly recommended of a height adjusting mechanism 60.

Figure 5:
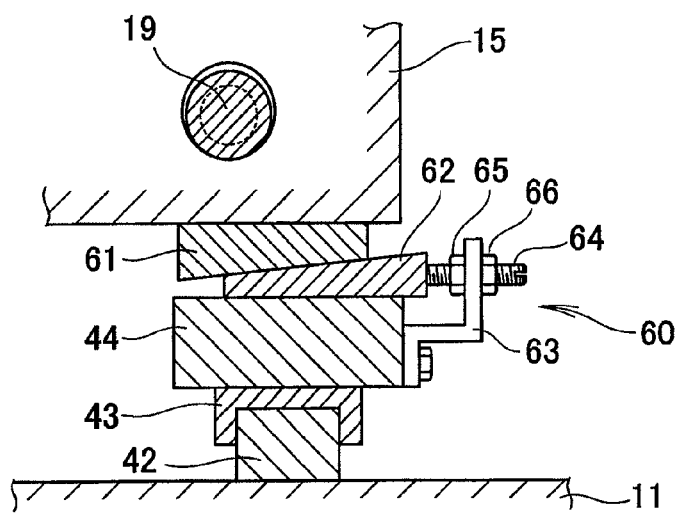
FIG. 5 is a cross-sectional view taken along line 5-5 of FIG. 2.

As shown in FIG. 5, the height adjusting mechanism 60 includes a first inclined liner 61 fixed to the mold clamping cylinder 15 and having an inclined lower surface, a second inclined liner 62 placed on the pedestal 44 and having an inclined upper surface, a metal fitting or bracket 63 attached to the pedestal 44, a screw or threaded element 64 extending horizontally from the second inclined liner 62 and passing through the metal fitting 63, and inner and outer nuts 65, 66 placed in threaded engagement with the screw 64. Sufficient loosening of the outer nut 66 and tightening of the inner nut 65 cause the screw 64 to move leftward in the drawing sheet. This causes the second inclined liner 62 to push up the first inclined liner 61, whereby the tie-bars 19 move up together with the mold clamping cylinder 15. In FIG. 2, the clearance C1 decreases while the clearance C1 increases.

In FIG. 5, sufficient loosening of the inner nut 65 and tightening of the outer nut 66 cause the screw to move rightward in drawing sheet. As a result, the tie-bars 19 come down together with the mold clamping cylinder 15. In FIG. 2, the clearance C1 increases while the clearance C2 decreases.

After height adjustment is performed by the height adjustment mechanism 60, the inner nut 65 and the outer nut 66 are tightened, whereby the second inclined liner 62 is fixed and the mold clamping cylinder 15 is secured to the pedestal 44.

This concludes the adjustment to set the clearances C1 and C2 to be identical or substantially identical to each other.

An operation of the thus-arranged mold clamping mechanism 10 will now be described with reference to FIG. 2 and so forth.

Figure 6:
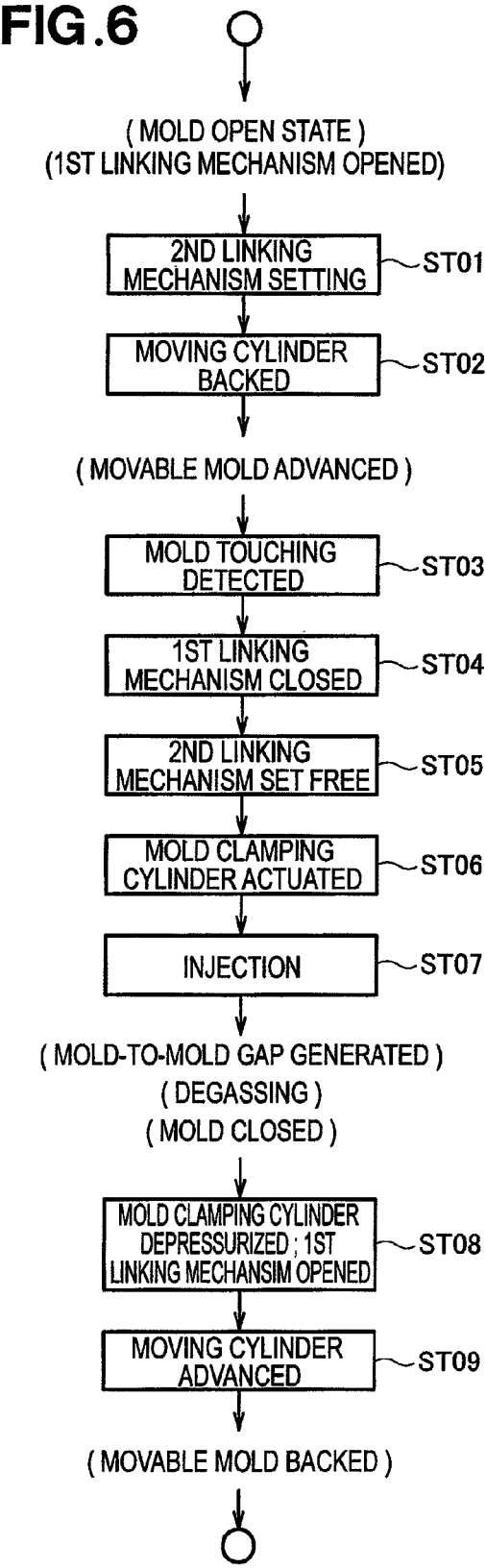
FIG. 6 is a flowchart illustrating a mold clamping process.

FIG. 6 starts with the state of the mold and the first linking mechanism 20 being opened (as illustrated in FIG. 4A). The second linking mechanism 50 is placed in a set condition (ST01). Namely, as shown in FIG. 2, by means of the second linking mechanism 50, the distance between the mold clamping cylinder 15 and the movable platen 18 is set at a predetermined value.

Next, the mold opening/closing actuator 16 is moved backward (ST02). Then, the pedestal 44, mold clamping cylinder 15, the movable platen 18 and the movable mold 17, shown in FIG. 2, move in a lump forward toward the fixed platen 13.

In ST03, detection is carried out to determine whether the movable platen 18 has touched the fixed mold 12. This detection is effected by use of a limit switch 67 provided to the mold opening/closing actuator 16 shown in FIG. 2.

Based on the detected information, the first linking mechanism 20 is placed in a closed state as shown in FIG. 4B (ST04).

The second linking mechanism 50 is set free since its role is finished now (ST05).

Figure 8A:
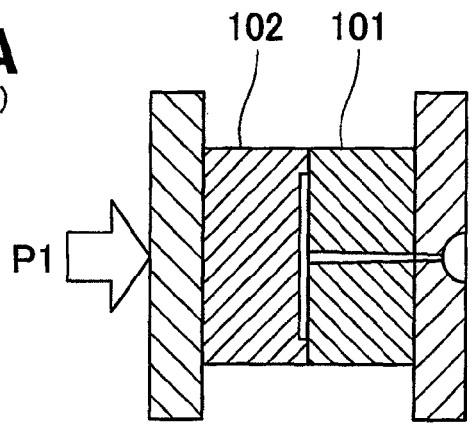
FIG. 8A-8C are views illustrating a conventional injection molding process.

The mold clamping cylinder 15 is advanced (ST06). This completes the clamping of the movable mold 17 with the fixed mold 12. Clamping force used herein is P1 shown in FIG. 8A.

Figure 8B:
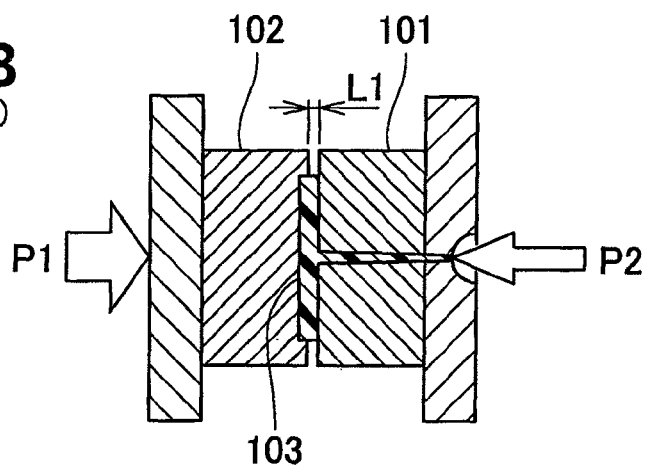
Figure 8C:
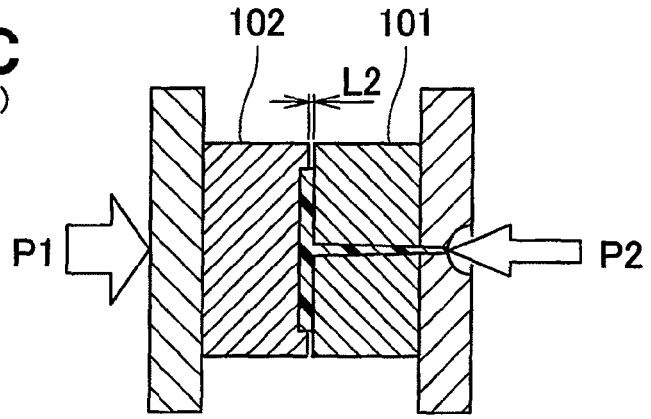

On the basis of mold-clamping-complete information, injection is carried out (ST07). As shown in FIGS. 8B and 8C, the mold is opened slightly, degassed and then closed. At this time, as shown in FIG. 2, owing to the movable platen 18 being placed so as to not be in slide-contact with the tie-bars 19 and the sub-slider 46 being the linear guide, extremely smooth movement of the movable platen 18, slight mold opening and mold closing can be effected.

Upon solidification of a resin material, the mold clamping cylinder 15 is depressurized while the first linking mechanism 20 is brought into an open state (ST08). The mold opening/closing actuator 16 is advanced (ST09). The movable mold 17 and so forth move back to the position of FIG. 2.

In the described embodiment, a sliding cylinder such as a hydraulic cylinder and a pneumatic cylinder is employed to function as the mold opening/closing actuator 16. Sliding cylinders are inexpensive and hence good to manufacture mold opening/closing actuators inexpensively. This would not exclude other arrangements such as electric cylinders.

Next, discussion will be made as to a modification of the embodiment according to the present invention.

Figure 7:
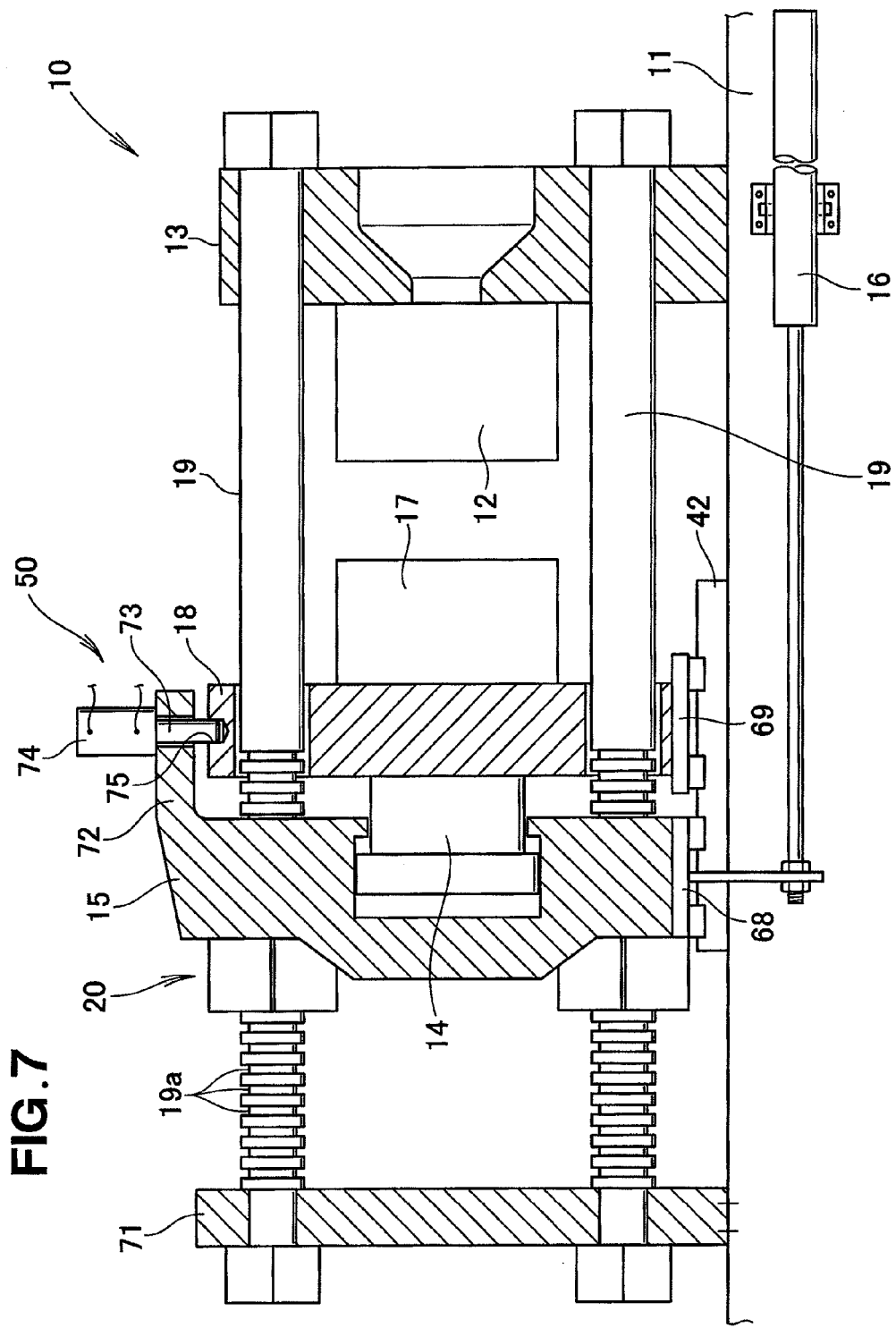
FIG. 7 is a cross-sectional view illustrating a modification of the mold clamping mechanism.

As shown in FIG. 7, the base 11 is provided with the rail 42. First and second sliders 68, 69 are disposed on the rail 42. The mold clamping cylinder 15 is secured to the first slider 68 while the movable platen 18 is secured to the second slider 69. The mold opening/closing actuator 16 may be connected to the first slider 68. The mold opening/closing actuator 16 may be secured to the base 11. Since the mold opening/closing actuator 16 is disposed away from the movable platen 18, the movable platen 18 remains free from a sliding resistance.

In addition, a tie-bar support platen 71 is disposed to vertically extend from the base 11 so as to support top ends of the tie-bars 19, 19. With the tie-bars 19, 19 supported at both ends by the fixed platen 13 and the tie-bar support platen 71, it becomes unnecessary for the tie-bars 19, 19 to be received by the mold clamping cylinder 15, thereby rendering the height adjustment easy to perform.

Note also that the second linking mechanism 50 may be formed to include an arm 72 extending from the mold clamping cylinder 15 up to the movable platen 18 (or from the movable platen 18 up to the mold clamping cylinder 15), a linear actuator 74 mounted to the arm 72 and having a rod 73 extending perpendicularly to the tie-bar 19, and a recessed part 75 provided to the movable platen 18 and allowing engagement of the rod 73. As the linear actuator 74, an inexpensive pneumatic cylinder may be adopted, whereby the second linking mechanism 50 becomes simple in construction and easy to manufacture inexpensively.

Other constituents than those explained above are similar to those illustrated in and explained in relation to FIG. 2 and, therefore, their description will be omitted.

The present invention is particularly suitable for use on a mold clamping mechanism employed in a horizontal injection molding apparatus.

What is claimed is:

1. A horizontal mold clamping mechanism comprising:
   a base;
   a rail disposed on the base;
   a slider fitted with the rail;
   a pedestal placed on the slider, the pedestal being provided with a sub-rail and a sub-slider fitted with and guided by the sub-rail;
   a fixed platen secured to the base for supporting a fixed mold;
   a mold clamping cylinder secured to the pedestal and horizontally movably supported on the base, the mold clamping cylinder being laid parallel to the fixed platen and having a piston rod extending toward the fixed mold;
   a mold opening/closing actuator for moving the mold clamping cylinder, the mold opening/closing actuator being connected to the pedestal;
   a movable platen secured to the sub-slider and disposed between the fixed platen and the mold clamping cylinder, the movable platen being connected to the piston rod and horizontally movably supported on the base for supporting a movable mold;
   a tie-bar extending horizontally from the fixed platen and passing through the movable platen and the mold clamping cylinder; and
   a first linking mechanism for selectively linking the mold clamping cylinder to the tie-bar;
   wherein the movable platen is provided with a through-hole having a hole diameter greater than an outer diameter of the tie-bar to provide a clearance for preventing slide-contact between the tie-bar and an inner peripheral surface of the through-hole.

2. The horizontal mold clamping mechanism according to claim 1, wherein the sub-slider comprises a linear guide placed in sliding contact with the sub-rail through rolling elements.

3. The horizontal mold clamping mechanism according to claim 1, wherein the mold clamping cylinder is secured to the pedestal through a height adjusting mechanism.

4. A horizontal mold clamping mechanism comprising:
   a base;
   a fixed platen secured to the base for supporting a fixed mold;
   a rail disposed on the base;
   first and second sliders fitted with the rail, the second slider being guided by the rail;
   a mold clamping cylinder secured to the first slider and horizontally movably supported on the base, the mold clamping cylinder being laid parallel to the fixed plate and having a piston rod extending toward the fixed mold;
   a mold opening/closing actuator for moving the mold clamping cylinder, the first slider being secured to the mold opening/closing actuator;
   a movable platen secured to the second slider and disposed between the fixed platen and the mold clamping cylinder, the movable platen being connected to the piston rod and horizontally movably supported on the base for supporting a movable mold;
   a tie-bar extending horizontally from the fixed platen and passing through the movable platen and the mold clamping cylinder; and
   a first linking mechanism for selectively linking the mold clamping cylinder to the tie-bar;
   wherein the movable platen is provided with a through-hole having a hole diameter greater than an outer diameter of the tie-bar to provide a clearance for preventing slide-contact between the tie-bar and an inner peripheral surface of the through-hole.

5. The horizontal mold clamping mechanism according to claim 4, wherein each of the first and second sliders comprises a linear guide held in sliding contact with the rail through rolling elements.

6. The horizontal mold clamping mechanism according to claim 4, wherein the first linking mechanism comprises: a plurality of circumferential grooves formed in the tie-bar; lock-plates engaged in the circumferential grooves; a lock-plate moving actuator for moving the lock-plates in a direction orthogonal to an axis of the tie-bar; and a guide disposed on the mold clamping cylinder for suppressing movement of the lock-plates in an axial direction of the tie-bar.

7. The horizontal mold clamping mechanism according to claim 1, further comprising a second linking mechanism provided, apart from the piston rod, to the mold clamping cylinder and the movable platen for mechanically connecting the mold clamping cylinder and the movable platen together.

8. The horizontal mold clamping mechanism according to claim 7, wherein the second linking mechanism comprises: a ball screw laid parallel to the tie-bar; a rotary actuator for rotating the ball screw; and a ball nut engaged in the ball screw.

9. The horizontal mold clamping mechanism according to claim 7, wherein the second linking mechanism comprises: an arm extending from the mold clamping cylinder to the movable platen; a linear actuator mounted to the arm and having a rod extending orthogonal to the tie-bar; and a recessed part provided to the movable platen for allowing fitted engagement of the rod therein.

10. The horizontal mold clamping mechanism according to claim 1, wherein the first linking mechanism comprises: a plurality of circumferential grooves formed in the tie-bar; lock-plates engaged in the circumferential grooves; a lock-plate moving actuator for moving the lock-plates in a direction orthogonal to an axis of the tie-bar; and a guide disposed on the mold clamping cylinder for suppressing movement of the lock-plates in an axial direction of the tie-bar.

11. The horizontal mold clamping mechanism according to claim 1; further comprising a tie-bar support platen extending vertically from the base so as to support top ends of the tie-bars.

12. The horizontal mold clamping mechanism according to claim 3, wherein the height adjusting mechanism includes a first inclined liner fixed to the mold clamping cylinder and having an inclined lower surface, a second inclined liner placed on the pedestal and having an inclined upper surface, a fitting attached to the pedestal, and a threaded element extending horizontally from the second inclined liner and passing through the fitting.

* * * * *